United States Patent Office 3,391,329
Patented July 2, 1968

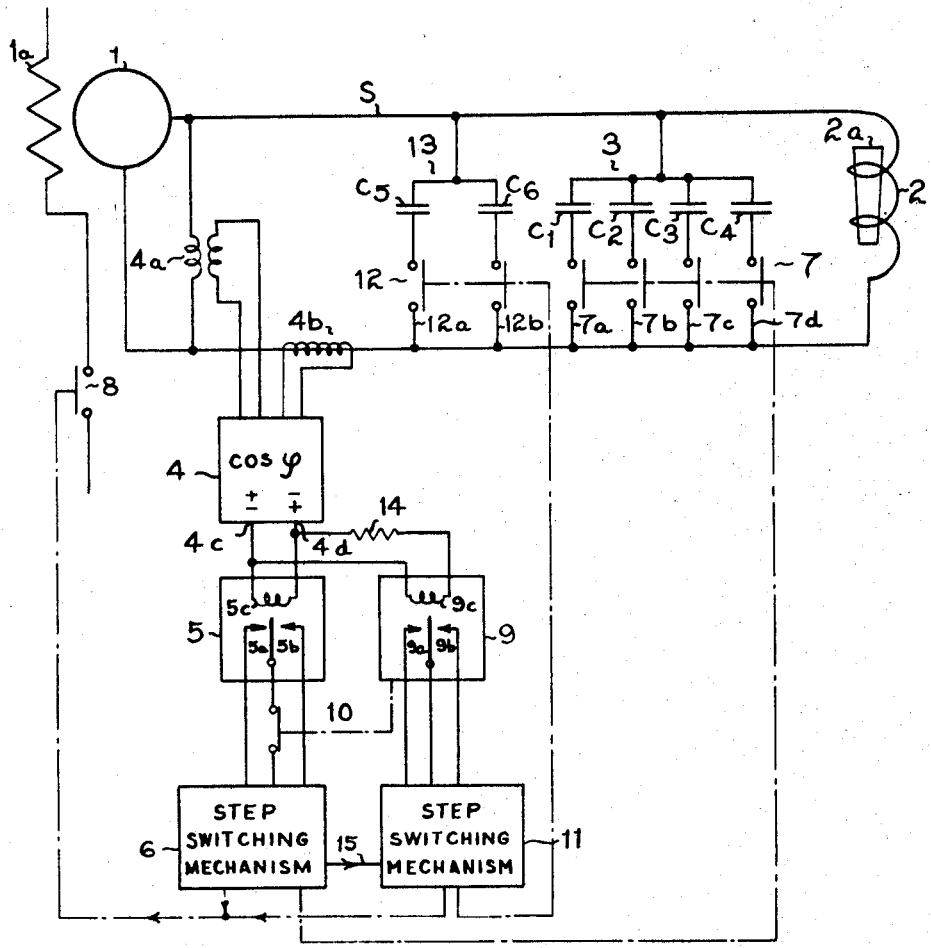

3,391,329
APPARATUS FOR COMPENSATING WATTLESS POWER COMPONENT OF INDUCTIVE POWER CONSUMERS
Hans G. Meyer, Zurich, Switzerland, assignor to Aktiengesellschaft Brown, Boveri & Cie, Baden, Switzerland, a joint-stock company
Filed Feb. 16, 1966, Ser. No. 527,897
Claims priority, application Switzerland, Feb. 19, 1965, 2,323/65
6 Claims. (Cl. 322—20)

The present invention relates to an improved arrangement for compensating the wattless power component of inductive type power consumers and particularly by means of condensers which are selectively connected in circuit with the inductive power consumer in accordance with a variation in the inductance value of the consumer, so that a substantial match as between the inductance and its compensating capacitance is reached at all times whereby the generator or other power source which feeds the inductive power consumer is required to furnish little or no wattless power.

As an example, an induction type furnace system for annealing or melting, and operating usually at a medium electrical frequency includes, on the electrical side, a power source such as an electrical generator and the induction coil of the furnace. Such an operation is highly inductive in character. It has thus been conventional to connect condensers in parallel with the furnace coil so that the generator is required to furnish little or no wattless power. Due to inherent thermal characteristics involved in annealing or melting of ferrous metal, the inductance of the furance coil will vary continuously throughout the process and it has thus been conventional to arrange the whole of the capacitance provided by the condensers in such manner as to permit selective grouping of condensers so that different condensers can be connected in different groupings to establish an overall fine gradation of capacitance. Such condenser grouping has, for example, been done by hand, using the reading of a phase indicator such as a cos $\varphi$ meter as a guide for determining how much capacitance is needed to be added or substracted from the circuit in order to bring the current and voltage at the output side of the generator into phase with each other.

It is also known to make use of a regulator which operates automatically to execute the commands for changing the grouping of the condensers so that compensation for wattless power occurs automatically. For this purpose there has been made available a phase-sensitive measuring device responsive to the displacement in phase as between the voltage and current in the line between the generator and inductive load which determines the sense of the phase deviation, i.e. lagging or leading $\varphi$ dependent upon whether the inductance or capacitance dominates at the moment, and accordingly actuates a switching contact mechanism which controls a stepping switch by means of which the condensers are re-grouped in the necessary manner to once again attain the desired zero wattless power condition. During such a switching operation, the output voltage of the generator is in effect disconnected from its load circuit by de-energizing its field circuit so that the condenser-switching operation can be effected in a substantially voltage-free manner. In the case of major deviations in phase as between the generator voltage and current, several such condenser switching or re-grouping operations will occur in succession until the phase measuring mechanism once again indicates phase coincidence within the response limits set for the system.

One disadvantage of the previously known systems which are quite delicate is that when a major change in inductivity of the furnace coil takes place in a sudden manner, e.g. when the metal reaches the Curie point, or when keeping the molten metal warm during pouring-off from the crucible, etc., too much time is required for the compensation system to act, i.e. the time involved in de-energizations, condenser switching and subsequent phase examination is so long that the desired regulating operation cannot follow any rapid and major change which takes place in the inductivity of the load.

The principal object of the present invention is to eliminate this disadvantage and hence, provide a wattless power compensating system which is capable of more quickly executing the necessary re-adjustment in the total capacitance needed to re-establish the desired phase relation as between generator voltage and current, and especially in situations where the change in inductance of the load changes quite quickly and also to a major extent.

In accordance with the invention, both coarse and fine groupings of condensers are employed to achieve the necessary compensation, the fine grouping of one bank of condensers being achieved over a relatively long resetting, or re-grouping time, and the coarse grouping of another bank of condensers being achieved in a relatively shorter resetting time. Control over the operations of the fine grouping of the condensers in the related condenser bank is effected by means of a phase measuring device which controls a first step-switching device which selectively switches in or out the relatively smaller condensers in the fine-grouping condenser bank, and control over the operations of the coarse grouping of the relatively larger condensers in its related condenser bank is effected by this same phase measuring device which controls a second step-switching device which selectively switches in or out the condensers in the coarse-grouping condenser bank. The sensitivity of the response of the second step-switching mechanism controlling the coarsely graded condenser bank is less than that of the first step-switching mechanism controlling the finely graded condenser bank, and means are provided for temporarily disconnecting the first step-switching device while the second step-switching device is functioning to re-group the coarse, i.e. relatively larger condensers of the coarse condenser bank.

The foregoing objects and advantages inherent in the invention will become more apparent from the following detailed description of one suitable embodiment thereof and from the accompanying drawing, the single figure of which shows a circuit diagram for the improved wattless power compensating system.

With reference now to the drawing, the inductive load to be compensated is illustrated in the form of a furnace coil 2 surrounding crucible 2a. The heating coil 2 is supplied with power from a generator 1 having a field element 1a. For simplicity in illustrating the circuit between generator 1 and coil 2 only one conductor S interconnecting the two has been shown. The bank of finely graded condensers is shown at 3, these being selectably connectable in parallel with the inductance coil 2. As an example, the fine condenser bank 3 is shown to contain four condensers C1 to C4. Condenser C2 has twice the capacity of condenser C1, condenser C3 has a capacity four times greater than that of C1, and condenser C4 has a capacity eight times greater than that of condenser C1. One side of each of these condensers is connected to the power supply conductor S extending between the output terminal of generator 1 and furnace coil 2, and the other side of each of these condensers is selectably connected electrically in parallel with coil 2 through one set of contacts, 7a to 7d respectively of relay 7.

A phase measuring device 4 is shown connected to the power supply conductor by way of the usual voltage transformer 4a and current transformer 4b. The phase measuring phase device is itself conventional and may, for example, be of the bridge circuit type having controllable semiconductor elements therein. This bridge circuit generates at its output terminals a direct current the polarity of which depends upon the sense of the deviation in phase i.e. leading or lagging as between the voltage and current in the power supply conductor S to the coil 2. Thus, for a deviation in one sense, one output terminal 4c of the phase measuring device is positive and the other terminal 4d negative, and for a phase deviation in the opposite sense, terminal 4c is negative and terminal 4d positive.

Using $\varphi$ to represent the phase deviation, when cos $\varphi = 1$, the current output from the bridge type phase measuring device 4 is zero. If the capacitive load represented by the compensating condenser bank exceeds the inductive load represented by furnace coil 2, the output from the phase measuring device 4 is positive. For an opposite condition wherein the inductive load exceeds the capacitive load, the output from phase measuring device 4 is negative. The output from the phase measuring device 4 is supplied to an actuating coil 5c of a contact switching device 5 such that contacts 5a or 5b will be actuated depending upon the direction of current flow through coil 5c which, in turn depends upon the polarity of the output from the phase measuring device 4. Relay contacts 5a, 5b lead through a switching-out contact 10 to a stepping switch mechanism 6 of known construction and which is therefore illustrated in block form only. The stepping switch 6 is mechanically linked to relay 7 and the stepping effected by switch 6 in one direction or the closed—depending upon whether contact 5a or 5b is closed— serves to actuate one or more of the relay contacts 7a to 7d whereupon the respective condensers C1 to C4 are switched in or out of the load circuit dependent upon whether the reactive component of the furnace current is inductive (lagging) or capacitive (leading). The switching in of condensers C1 to C4 can be effected in such manner that condenser elements of about the same size are added, requiring a correspondingly large number of condenser elements. Advantageously, however, the stepping mechanism 6 is constructed in such manner known in itself, that groups of condensers of different overall capacity are formed, e.g. according to the capacity ratio of 1:2:4:8 for condensers C1 to C4 previously mentioned. With the four condensers C1 to C4 so graded as to capacity, sixteen capacity values can be grouped by the step switching mechanism 6.

It is essential that the grouping of condensers C1–C4 of the condenser bank 3 be effected in fine degrees so that the variation of the capacity of this condenser bank will occur in such small values as not to produce a disturbing effect on the supply generator 1. To avoid any pendulum or oscillating effect resulting in over-compensation, the switch contact unit 5 must be provided with a certain sufficiently great insensitivity or response lag which must be at least somewhat greater than that which corresponds to the phase deviation when inserting or disconnecting the smaller condenser stage.

The working of the stepping mechanism 6 and of the relay contacts 7a–7d in switching from one capacity stage to the next requires a certain time and this has undesirable effects upon generator 1. To eliminate this undesirable characteristic, the present invention adds to the wattless power compensating arrangement which has been described a coarse grouping of larger condensers in a second condenser bank 13. This second condenser bank has been schematically represented by two condensers C5 and C6. One side of each of these condensers is connected to the power supply conductor S and the opposite side of each condenser is selectably connectable through relay contacts 12a, 12b respectively of relay 12 so as to place these condensers selectively in parallel with the furnace coil 2.

For the switching in or out of condensers C5, C6 in the coarse graded condenser bank 13, a second switching contact unit 9 is utilized, and this includes an actuating coil 9c supplied from the output of the phase deviation measuring device 4 and which controls selective actuation of relay contact 9a or 9b dependent upon the polarity of the direct current output from its output.

The insensitivity factor of the switching contact unit 9 is chosen to be much greater than that of the previously described switching contact unit 5 for the fine condenser grouping. This greater insensitivity can be established, for example, by use of a resistance element 14 interposed in the electrical connections between the output terminals of the phase deviation measuring device 4 and relay contact control coil 9c. The insensitivity characteristic of the switching contact unit 9 can be selected such that it corresponds to a capacity variation according to the sum of the condensers in condenser bank 3.

Relay contacts 9a, 9b control operation of a step switching mechanism 11 similar to the switching mechanism 6 previously described, this mechanism 11 being mechanically linked to relay 12 for selective actuation of relay contacts 12a, 12b to insert or remove the coarsely graded condensers C5 and C6 with respect to the power circuit. In order to effect a savings in the number of contacts and condenser elements, the condensers in bank 13 are likewise grouped according to different capacities, the smallest capacity being, for example, equal to the sum of all fine degrees of the condensers in the finely graded condenser bank 3 i.e. from zero to fifteen. Thus, for example, condenser C5 can have a capacitance sixteen times greater than that of condenser C1, and condenser C6 can have a capacitance thirty two times greater than that of condenser C1.

The coarse condenser insertion, or disconnection, by means of the step switching mechanism 11 occurs whenever wattless current variations of large magnitude occur relatively suddenly, an operating condition in which the stepping mechanism 6 cannot follow fast enough to make the necessary compensation. During such a variation, the stepping mechanism 6 is temporarily disconnected by means of the relay contact 10 previously referred to, this latter relay being controlled by the switching contact unit 9.

During slow variations of the deviation in phase, i.e. at slow variations of cos $\varphi$, the coarse condenser stepping mechanism 11 is also set into operation by an end contact of the fine condenser stepping mechanism 6 through a connection 15 in order that the coarse graded condensers C5 and C6 of condenser bank 13 will establish the capacitance-rate continuation of the condenser bank 3.

The stepping mechanisms 6 and 11 also include additional contacts by which excitation of the field element 1a of generator 1 is interrupted through a control relay 8 interposed in the field in the excitation circuit whenever a switching of the condensers in the condenser banks 3 or 13 takes place, thus enabling the condenser switching in or out to be effected either under a completely voltless condition, or at least with a greatly reduced current according to the remanence factor in the exciter circuit 1a of the generator.

I claim:
1. Apparatus for compensating the wattless power component of an inductive power consumer connected to a power supply line and wherein said power consumer is of the type wherein the inductance value is subject to sudden and substantial changes, said apparatus comprising means for measuring the deviation in phase as between the voltage and current in said power supply line attributable to said inductive power consumer, said phase deviation measuring means also producing an output voltage whose magnitude and polarity depend respectively upon the extent of said phase deviation and the sense thereof, a first bank of fine graded condensers, a second bank of coarse graded condensers, fine and coarse condenser se- lector means controlled respectively in accordance with said output voltage for selectably connecting the fine and coarse graded condensers in said first and second condenser banks in parallel with said inductive power consumer, the insensitivity factor of said coarse condenser selector means being greater than that of said fine condenser selector means, and means for rendering said fine condenser selector means temporarily inoperable for changing the connections of the condensers in said first condenser bank while said coarse selector means is being operated to change the connections of the condensers in said second condenser bank.

2. Apparatus for compensating the wattless power component of an inductive power consumer connected to a power supply line and wherein said power consumer is of the type wherein the inductance value is subject to sudden and substantial changes, said apparatus comprising means for measuring the deviation in phase as between the voltage and current in said power supply line attributable to said inductive power consumer, said phase deviation measuring means also producing an output control voltage proportional to the extent of said deviation and the polarity of which depends upon the sense of said deviation, a first step switching mechanism controlled by said output voltage of said phase deviation measuring means, a first bank of finely graded condensers selectively connectable in parallel with said inductive power consumer by actuation of said first step switching mechanism, a second step switching mechanism also controlled by said output voltage of said phase deviation measuring means but whose insensitivity is greater than that of said first step switching means, a second bank of coarsely graded condensers selectably connectable in parallel with said inductive power consumer by actuation of said second step switching mechanism, and switching means also controlled by actuation of said second step switching mechanism for rendering said first step switching mechanism inoperable to change the connections of any of said condensers in said first condenser bank while said second step switching mechanism is being actuated.

3. Apparatus as defined in claim 2 for compensating the wattless power component of a variable inductance type power consumer, and which further includes means actuatable by either of said step switching mechanisms for interrupting the voltage on said supply line leading to said power consumer when either of said step switching mechanisms is actuated to change the connections of the condensers in the condenser banks respectively correlated therewith.

4. Apparatus as defined in claim 3 for compensating the wattless power component of a variable inductance type power consumer wherein a generator is included for supplying the voltage to said power supply line, and said means for interrupting said voltage is constituted by switching means controlled by either of said step switching mechanisms and which serve to disconnect the field element of said generator.

5. Apparatus as defined in claim 2 wherein the minimum capacity of any coarse condenser in said second condenser bank is at least equal to the sum of the capacitances of the fine condensers in said first condenser bank.

6. Apparatus as defined in claim 2 wherein the respective capacitances of the condensers in said first and second condenser banks vary in geometrical progression.

References Cited
UNITED STATES PATENTS 3,185,811  5/1965  Kasper et al. _____ 322—20 X JOHN F. COUCH, *Primary Examiner.*

WARREN E. RAY, *Examiner.*

H. HUBERFELD, *Assistant Examiner.*